(12) United States Patent
Henry et al.

(10) Patent No.: US 10,850,336 B2
(45) Date of Patent: Dec. 1, 2020

(54) COOLANT BONNET FOR A CUTTING TOOL

(71) Applicant: Kennametal Inc., Latrobe, PA (US)

(72) Inventors: Nicholas J. Henry, Greensburg, PA (US); Tom Bobos, Morton Grove, IL (US); Keith Hoover, Rockford, IL (US)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 16/250,040

(22) Filed: Jan. 17, 2019

(65) Prior Publication Data

US 2020/0230716 A1 Jul. 23, 2020

(51) Int. Cl.
*B23C 5/28* (2006.01)
*B23C 5/06* (2006.01)
*B23D 77/00* (2006.01)

(52) U.S. Cl.
CPC ............ *B23C 5/28* (2013.01); *B23C 5/06* (2013.01); *B23C 2250/12* (2013.01); *B23D 77/006* (2013.01)

(58) Field of Classification Search
CPC ......... B23C 5/28; B23C 5/06; B23C 2250/12; B23D 77/006; B23B 51/0486; B23B 51/06; B23B 2250/12; Y10T 408/458; Y10T 408/455
See application file for complete search history.

(56) References Cited

U.S. PATENT DOCUMENTS

| | | | |
|---|---|---|---|
| 2,867,140 A | * | 1/1959 | Getts .................. B23B 51/0486 408/57 |
| 8,696,252 B2 | | 4/2014 | Bonnarang et al. |
| 8,845,242 B2 | | 9/2014 | Schuffenhauer et al. |
| 9,168,601 B2 | | 10/2015 | Ning et al. |
| 9,802,260 B2 | | 10/2017 | Zimmerman et al. |
| 2011/0217131 A1 | | 9/2011 | Bonnarang |
| 2011/0262234 A1 | | 10/2011 | Schuffenhauer |

FOREIGN PATENT DOCUMENTS

| | | |
|---|---|---|
| CN | 206882916 U | 1/2018 |
| JP | 64-20220 U | 2/1989 |

* cited by examiner

*Primary Examiner* — Sunil K Singh
*Assistant Examiner* — Paul M Janeski
(74) *Attorney, Agent, or Firm* — Larry R. Meenan (57) ABSTRACT

A coolant bonnet for a cutting tool includes a head portion, a shank portion, an internal coolant passage extending through the shank portion and into a coolant manifold disposed within the head portion, and one or more coolant ducts extending radially outward from the manifold to an outlet port. Each coolant duct is aligned with the chip flutes of the cutting tool and directs coolant at a predetermined exit angle in an axially rearward direction toward the cutting edges of a cutting insert mounted on the cutting tool. A method of providing coolant to a cutting edge of a cutting insert mounted on the cutting tool is also disclosed.

18 Claims, 7 Drawing Sheets

COOLANT BONNET FOR A CUTTING TOOL

BACKGROUND OF THE INVENTION

Known rotary cutting tools for performing reaming operations typically comprise a cutting head having an axis of rotation. The cutting head has a forward end and a peripheral surface extending rearwardly therefrom. The peripheral surface includes at least two cutting inserts or wiping pads extending rearwardly from the forward end and a chip flute for the evacuation of chips produced during the cutting operation.

One disadvantage of conventional reamers is that the chips produced during a cutting operation flow directly into the chip flute, thus lacking the ability to control the shape and evacuation of the chips during the cutting operation. Consequently, the chips may become tangled on the tool shank and/or remain in the machined holes during the cutting operation.

The original tool was designed to push the chips forward, through the hole, using radial coolant in the flutes, directed toward the cutting edges. The natural chip flow of the material, combined with the cutting geometry caused the chip to want to flow backward, toward the entry point of the hole. This is not ideal as it essentially blocks any coolant from reaching the cutting edge, as well as hindering the chip flow.

SUMMARY OF THE INVENTION

The problem of inadequate coolant flow to the cutting edges in a reamer is solved by providing a coolant bonnet that directs the flow of coolant rearwards to the cutting edges of the reamer.

In one aspect, a coolant bonnet for a cutting tool comprises a head portion; a shank portion; an internal coolant passage extending through the shank portion and into a coolant manifold disposed within the head portion; and one or more coolant ducts extending radially outward from the manifold to an outlet port. Each coolant duct is in fluid communication with the coolant manifold, wherein each coolant duct directs coolant at a predetermined exit angle with respect to the central, longitudinal axis of the coolant bonnet in an axially rearward direction toward the cutting tool.

In another aspect, a combination comprises a cutting tool and a coolant bonnet. The cutting tool comprises a cutting portion having a forward end and a rearward end and a peripheral surface therebetween, the cutting portion including a chip flute that extends rearwardly from the forward end; and a cutting insert mounted on the cutting portion. The coolant bonnet is mounted onto the cutting tool and comprises a head portion; a shank portion; an internal coolant passage extending through the shank portion and into a coolant manifold disposed within the head portion; and one or more coolant ducts extending radially outward from the manifold to an outlet port, each coolant duct in fluid communication with the coolant manifold, wherein each coolant duct directs coolant at a predetermined exit angle with respect to a central, longitudinal axis of the coolant bonnet in an axially rearward direction toward the cutting insert of the cutting tool.

In yet another aspect, a method of providing coolant to a cutting edge of a cutting insert mounted on a cutting tool, comprising:

mounting a coolant bonnet on a cutting end of the cutting tool such that one or more coolant ducts directs coolant at a predetermined exit angle with respect to a central, longitudinal axis of the coolant bonnet in an axially rearward direction toward the cutting tool.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

FIG. 1 is a side view of a typical cutting tool, such as a multi-flute reamer, and the like;

DETAILED DESCRIPTION OF THE INVENTION

Below are illustrations and explanations for a version of a cutting tool, such as an orbital drill, and the like, with both right-handed helical or spiral flutes and left-handed helical or spiral flutes for machining a workpiece (not shown) made of multiple materials. However, it is noted that the cutting tool may be configured to suit any specific application, such as reaming, end milling, and the like, and is not limited only to the example in the illustrations.

The description herein of specific applications should not be a limitation on the scope and extent of the use of the cutting tool.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Throughout the text and the claims, use of the word "about" in relation to a range of values (e.g., "about 22 to 35 wt %") is intended to modify both the high and low values recited, and reflects the penumbra of variation associated with measurement, significant figures, and interchangeability, all as understood by a person having ordinary skill in the art to which this invention pertains.

For purposes of this specification (other than in the operating examples), unless otherwise indicated, all numbers expressing quantities and ranges of ingredients, process conditions, etc are to be understood as modified in all instances by the term "about". Accordingly, unless indicated to the contrary, the numerical parameters set forth in this specification and attached claims are approximations that can vary depending upon the desired results sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Further, as used in this specification and the appended claims, the singular forms "a", "an" and "the" are intended to include plural referents, unless expressly and unequivocally limited to one referent.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements including that found in the measuring instrument. Also, it should be understood that any numerical range recited herein is intended to include all sub-ranges subsumed therein. For example, a range of "1 to 10" is intended to include all sub-ranges between and including the recited minimum value of 1 and the recited maximum value of 10, i.e., a range having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Figure 1:
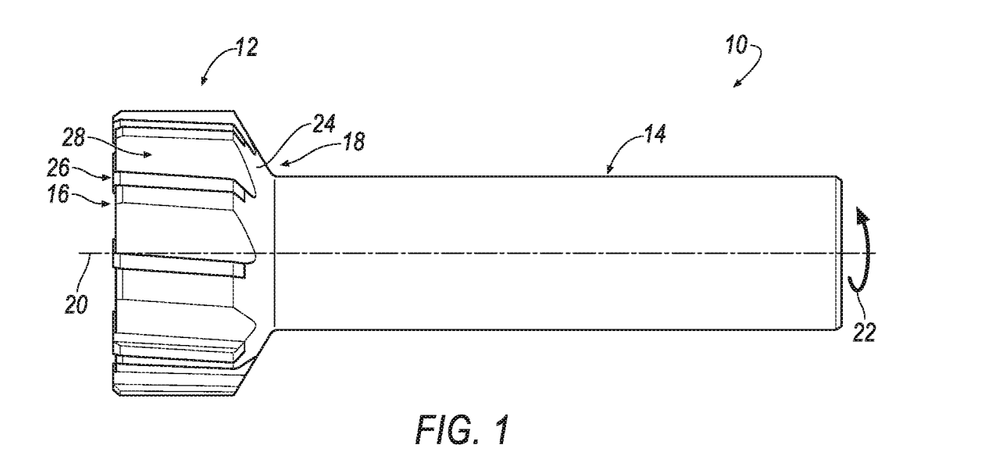

Referring to FIG. 1, wherein like reference characters represent like elements, an exemplary cutting tool for orbital drilling is generally shown at 10.

Figure 2:
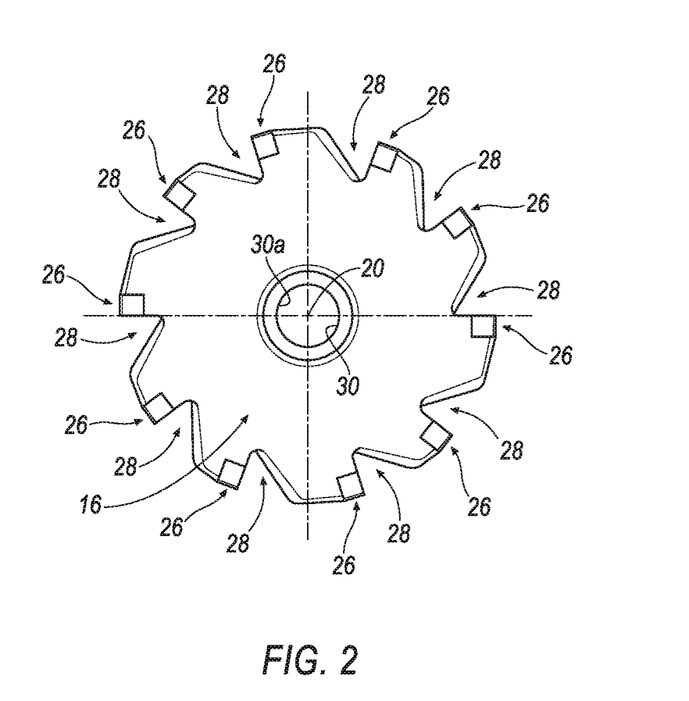
FIG. 2 is an end view of the multi-flute reamer of FIG. 1.

Referring to FIGS. 1 and 2, wherein like reference characters represent like elements, a typical cutting tool, such as a multi-flute reamer, is generally shown at 10. In general, the multi-flute reamer 10 includes a cutting portion 12 and a mounting portion 14. The cutting portion 12 includes a substantially planar forward end 16, and a rearward end 18. The cutting portion 12 rotates about a central, longitudinal axis 20 and a direction of rotation 22.

The cutting portion 12 includes a peripheral side surface 24 extending between the forward end 16 and the rearward end 18. The peripheral side surface 24 includes a plurality of cutting inserts 26 mounted thereon that extend from the forward end 16 toward the rearward end 18. In the illustrated embodiment, the reamer 10 includes ten (10) cutting inserts 26. However, it will be appreciated that the invention is not limited by the number of cutting inserts, and that the invention can be practiced with any desirable number of cutting inserts, depending on design parameters, such as the cutting diameter of the reamer, and the like. A chip flute or chip gash 28 extends rearwardly from the forward end 16 toward the rearward end 18 of the cutting portion 12. The chip flute 28 extends rearwardly beyond the cutting insert 26 and allows chips formed by the cutting insert 26 to exit from the cutting portion 12 of the reamer 10 during a cutting operation. The reamer 10 also include an internal coolant passage 30 extending entirely through the cutting portion 12 and the mounting portion 14 of the reamer 10, as shown in FIG. 2. The coolant passage 30 allows coolant to enter the mounting portion 14 and exit the forward end 16 of the cutting portion 12.

Figure 3:
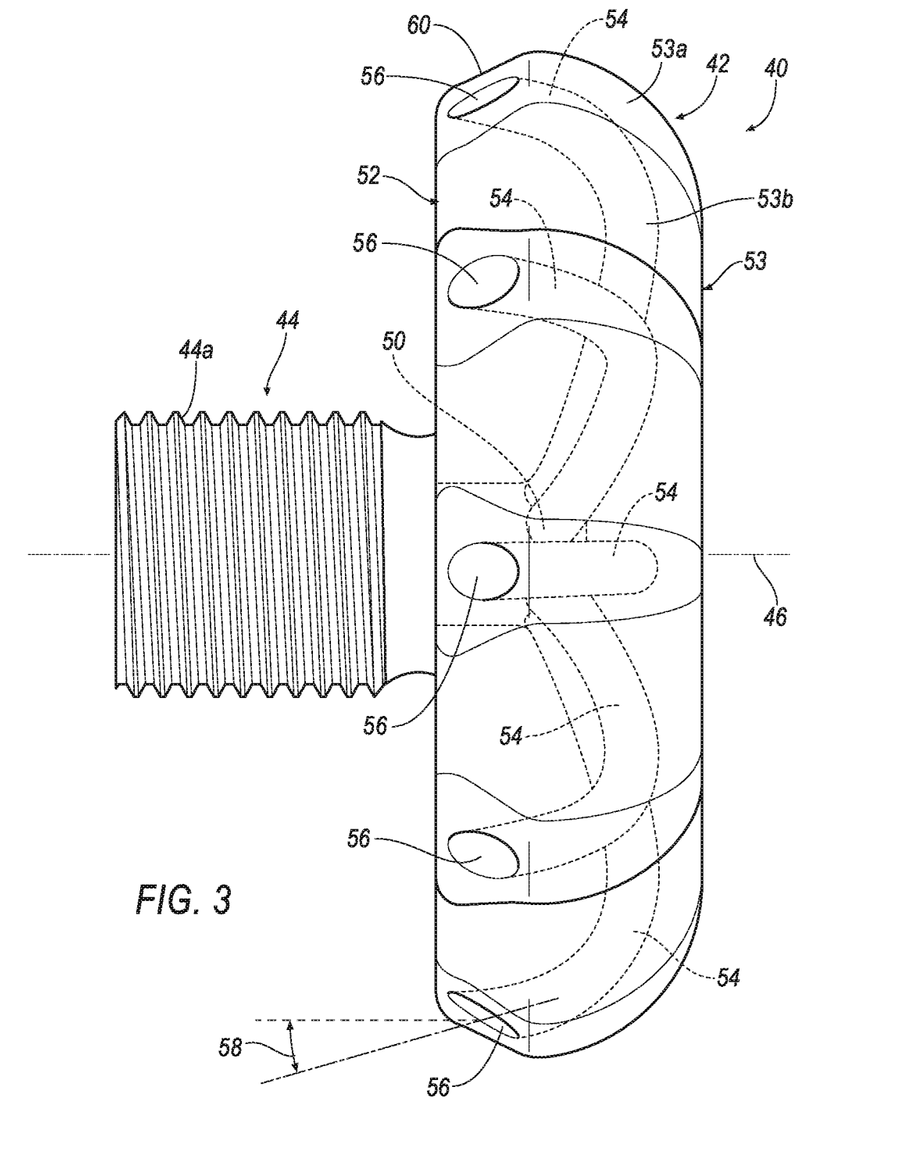
FIG. 3 is a side view of a coolant bonnet according to an embodiment of the invention.
Figure 4:
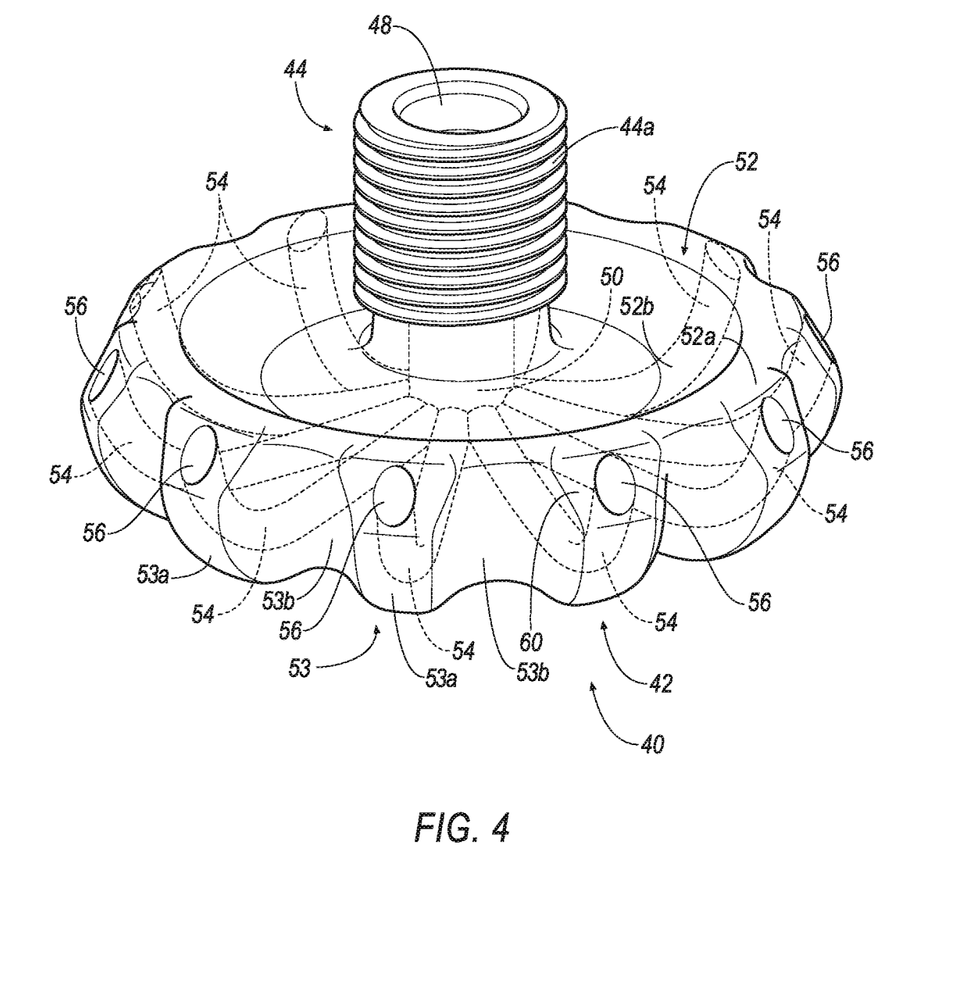
FIG. 4 is a rear isometric view of the coolant bonnet of FIG. 3.
Figure 5:
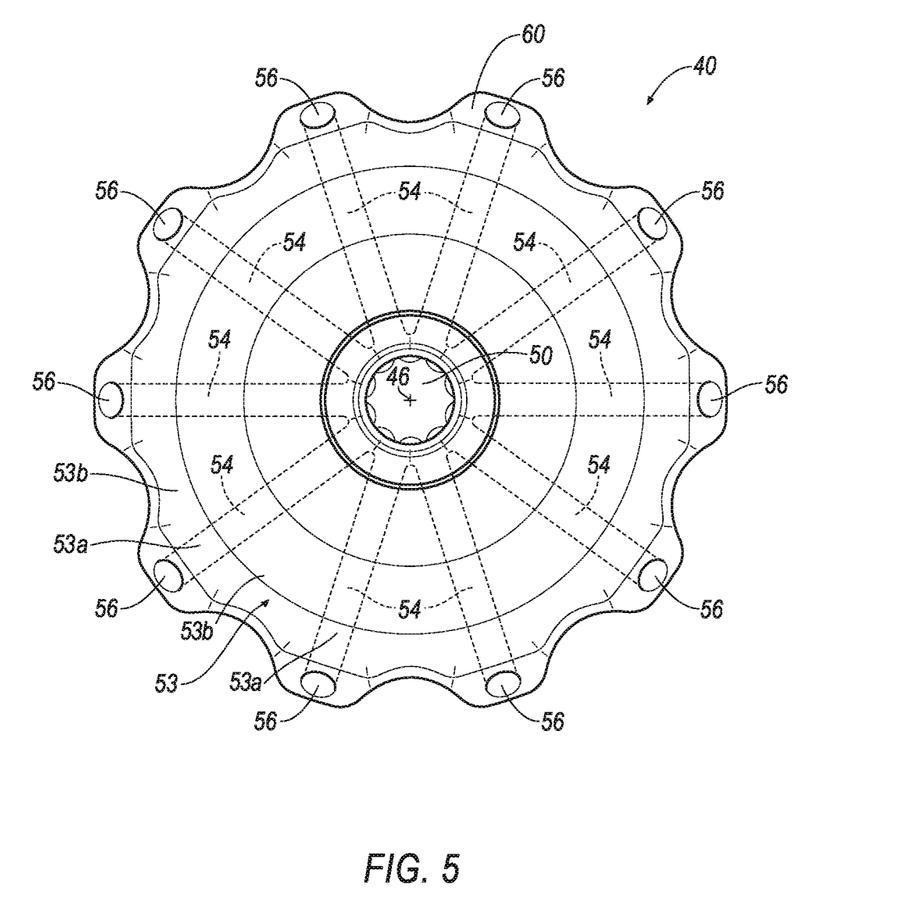
FIG. 5 is a top view of the coolant bonnet of FIG. 3.

Referring now to FIGS. 3-5, a coolant bonnet for the reamer 10 is shown generally at 40 according to an embodiment of the invention. In general, the coolant bonnet 40 is mushroom-shaped and includes a head portion 42 and a shank portion 44 extending axially rearward from the head portion 42 along a central, longitudinal axis 46. The shank portion 44 has external threads 44a for mating with internal threads 30a (FIG. 2) of the coolant passage 30 of the reamer 10 to form a threaded connection therebetween. In addition, the coolant bonnet 40 includes an internal coolant passage 48 in fluid communication with the coolant passage 30 of the reamer 10. The coolant passage 48 extends through the shank portion 44 to a coolant manifold 50 disposed within the head portion 42 and in fluid communication with the coolant passage 48.

Figure 6:
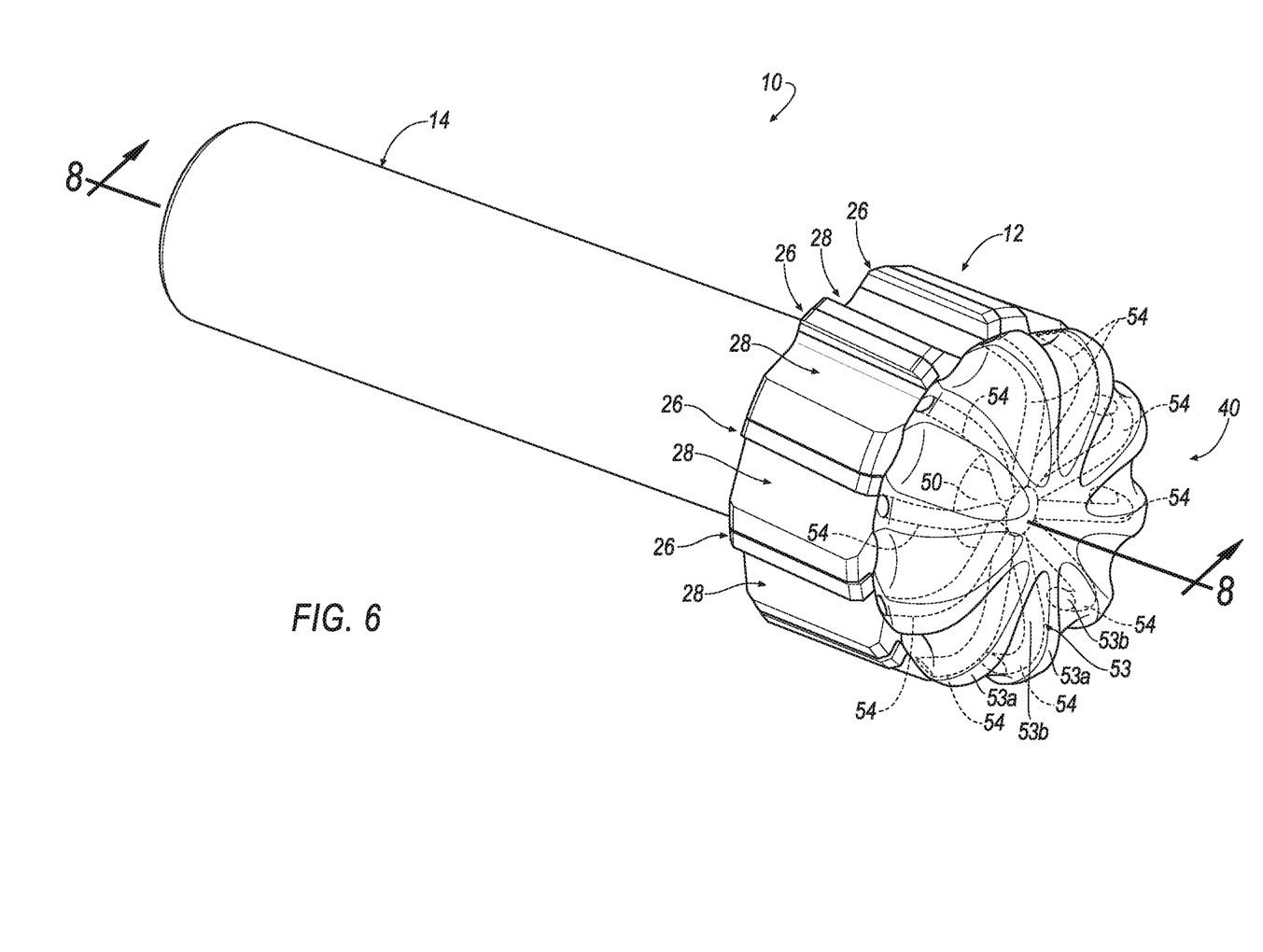
FIG. 6 is a front isometric view of a combination of the coolant bonnet of FIG. 3 and the multi-flute reamer of FIG. 1 when the coolant bonnet is properly mounted onto the multi-flute reamer.

The head portion 42 includes a bottom surface 52 for cooperating with the forward end 16 of the reamer 10 when the coolant bonnet 40 is threaded into the coolant passage 30 of the reamer 10, and a top surface 53. The bottom surface 52 is defined by a substantially planar annular surface 52a extending circumferentially about the perimeter and a recessed surface 52b disposed radially inward with respect to the annular surface 52a. The top surface 53 is defined by a wave-like topography comprising a plurality of crests 53a separated by troughs 53b. The amplitude of the wave-like topography increases in the radially outward direction, as shown in FIG. 6. The head portion also includes one or more internal coolant ducts 54 in fluid communication with and extending radially outward from the coolant manifold 50. Each coolant duct 54 has an outlet port 56 for allowing coolant to exit the head portion 42 of the coolant bonnet 40.

In the illustrated embodiment, there is a one-to-one correspondence in the number of coolant ducts 54 and the number of cutting inserts 26 mounted on the reamer 10. Thus, there are ten (10) coolant ducts 54 extending radially outward from the coolant manifold 50, as shown in FIG. 5. In addition, there is a one-to-one correspondence in the number of coolant ducts 54 and the number of crests 53a. However, it will be appreciated that the principles of the invention can be practiced with any desirable number of coolant ducts 54, depending on the number of cutting inserts 26 mounted on the reamer 10.

One aspect of the invention is that the direction of coolant that exits each outlet port 56 can be precisely controlled by forming each coolant duct 54 at a predetermined exit angle 58 with respect to the central, longitudinal axis 46 of the bonnet 40, as shown in FIG. 3. Each outlet port 56 of the coolant bonnet 40 may be located on a chamfered side surface 60 that can be used to determine the direction of coolant that exits each outlet port 56. It should be noted that the coolant that exits the coolant bonnet 40 is directed rearward towards the reamer 10 when the coolant bonnet 40 is mounted onto the reamer 10.

Another aspect of the invention is that the amount of coolant emitted by each coolant duct 54 (and outlet port 56) can be precisely controlled by forming each coolant duct 54 with a predetermined flow area. In the case of the coolant duct 54 having a substantially circular cross-sectional area, the amount of coolant emitted by each coolant duct 54 can be precisely controlled by forming each coolant duct 54 with a predetermined cross-sectional area at the exit of each coolant duct 54. However, it will be appreciated that the invention is not limited by the cross-sectional area of each coolant duct 54, and that the invention can be practiced with each coolant duct 54 having a non-circular cross-sectional area.

Figure 7:
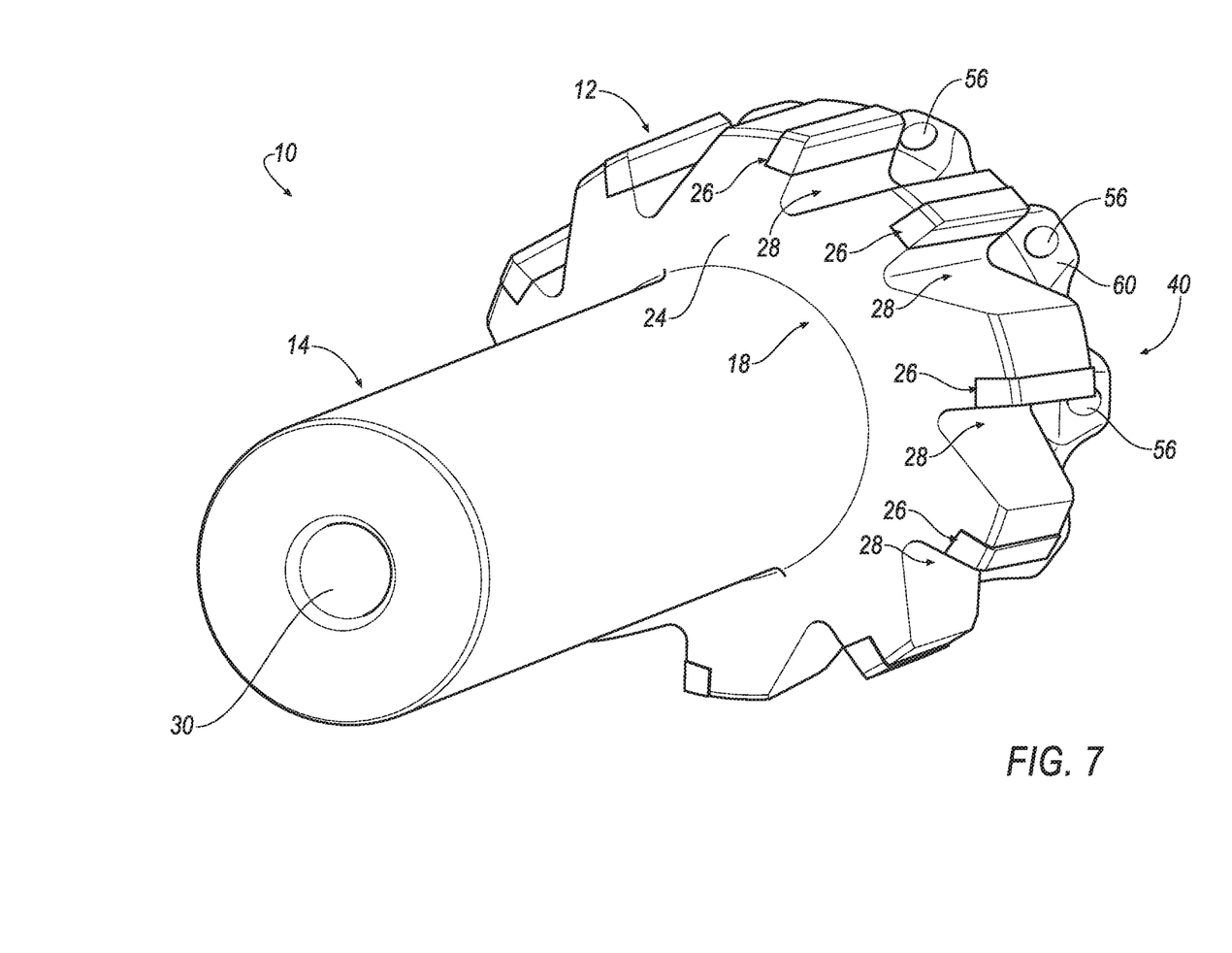
FIG. 7 is a rear isometric view of the combination of the coolant bonnet of FIG. 3 and the multi-flute reamer of FIG. 1 when the coolant bonnet is properly mounted onto the multi-flute reamer.
Figure 8:
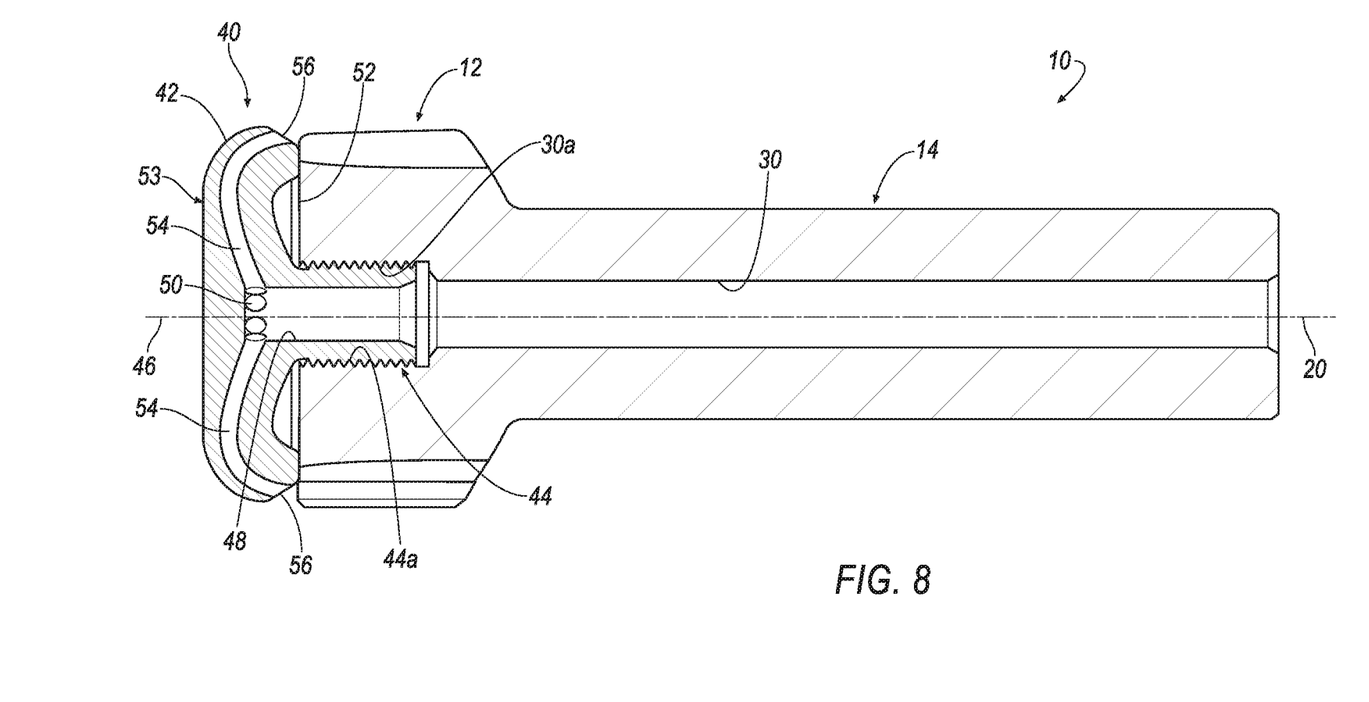
FIG. 8 is a cross-sectional view of the combination of the coolant bonnet of FIG. 3 and the multi-flute reamer of FIG. 1 when the coolant bonnet is properly mounted onto the multi-flute reamer taken along line 8-8 of FIG. 6.

When properly mounted onto the reamer 10, the central, longitudinal axis 46 of the coolant bonnet 40 is substantially aligned with the central, longitudinal axis 20 of the reamer 10, as shown in FIGS. 6-8. In addition, the outlet port 56 of each coolant duct 54 is substantially axially aligned with each flute 28 of the reamer 10 and proximate the cutting edge of each cutting insert 26. As a result, coolant is precisely supplied to each cutting insert 26 and each flute 28 in an axially rearward direction (i.e. toward the shank portion 14) of the reamer 10.

As described above, the coolant bonnet 40 of the invention allows the coolant to exit in front of the flutes 28 and is directed in an axially rearward direction toward the cutting edges of each cutting insert 26. As a result, coolant is precisely provided to the cutting edges of each cutting insert 26, while aiding in the removal of chips from the flutes 28 of the reamer 10.

The patents and publications referred to herein are hereby incorporated by reference.

Having described presently preferred embodiments the invention may be otherwise embodied within the scope of the appended claims.

What is claimed is:

1. A coolant bonnet for a cutting tool, comprising:
a head portion;
a shank portion;
an internal coolant passage extending through the shank portion and into a coolant manifold disposed within the head portion; and
one or more coolant ducts extending radially outward extending from the coolant manifold to an outlet port, each coolant duct in fluid communication with the coolant manifold,
wherein a portion of the one or more coolant ducts is non-linear; and
wherein each coolant duct directs coolant at a predetermined exit angle with respect to a central, longitudinal axis of the coolant bonnet in an axially rearward direction toward the cutting tool.

2. The coolant bonnet of claim 1, wherein the cutting tool includes one or more chip flutes, and wherein each outlet port is aligned with each chip flute of the cutting tool when the coolant bonnet is properly mounted onto the cutting tool.

3. The coolant bonnet of claim 1, wherein each outlet port is located on a chamfered side surface of the coolant bonnet.

4. The coolant bonnet of claim 1, wherein each coolant duct is circular in cross-sectional shape.

5. The coolant bonnet of claim 4, wherein an amount of coolant emitted by each coolant duct is controlled by forming each coolant duct with a predetermined cross-sectional area at an exit of each coolant duct.

6. The coolant bonnet of claim 1, wherein the cutting tool comprises a reamer.

7. A combination cutting tool and coolant bonnet, comprising:
a cutting tool, comprising:
a cutting portion having a forward end and a rearward end and a peripheral surface therebetween, the cutting portion including a chip flute that extends rearwardly from the forward end; and a cutting insert mounted on the cutting portion; and
a coolant bonnet mounted onto the cutting tool, the coolant bonnet comprising:
a head portion;
a shank portion;
an internal coolant passage extending through the shank portion and into a coolant manifold disposed within the head portion; and
one or more coolant ducts extending radially outward extending from the coolant manifold to an outlet port, each coolant duct in fluid communication with the coolant manifold,
wherein a portion of the one or more coolant ducts is non-linear; and
wherein each coolant duct directs coolant at a predetermined exit angle with respect to a central, longitudinal axis of the coolant bonnet in an axially rearward direction toward the cutting insert of the cutting tool.

8. The combination of claim 7, wherein the outlet port of the coolant bonnet is aligned with the chip flute of the cutting tool when the coolant bonnet is properly mounted onto the cutting tool.

9. The combination of claim 7, wherein each outlet port of the coolant bonnet is located on a chamfered side surface of the coolant bonnet.

10. The combination of claim 7, wherein each coolant duct of the coolant bonnet is circular in cross-sectional shape.

11. The combination of claim 10, wherein an amount of coolant emitted by each coolant duct of the coolant bonnet is controlled by forming each coolant duct with a predetermined cross-sectional area at an exit of each coolant duct.

12. The combination of claim 7, wherein the cutting tool comprises a reamer.

13. A coolant bonnet for a cutting tool, comprising:
a head portion having a top surface and a bottom surface, the top surface defined by a wave-like topography comprising a plurality of crests separated by troughs;
a shank portion;
an internal coolant passage extending through the shank portion and into a coolant manifold disposed within the head portion; and
one or more coolant ducts extending radially outward from the manifold, through a respective crest, to an outlet port, each coolant duct in fluid communication with the coolant manifold,
wherein each coolant duct directs coolant at a predetermined exit angle with respect to a central, longitudinal axis of the coolant bonnet in an axially rearward direction toward the cutting tool.

14. The coolant bonnet of claim 13, wherein an amplitude of the wave-like topography of the top surface increases in a radially outward direction.

15. The coolant bonnet of claim 13, wherein the bottom surface is defined by a circumferential, annular surface and a recessed surface disposed radially inward with respect to the circumferential, annular surface.

16. The coolant bonnet of claim 13, wherein the cutting tool includes one or more chip flutes, and wherein each outlet port is aligned with each chip flute of the cutting tool when the coolant bonnet is properly mounted onto the cutting tool.

17. The coolant bonnet of claim 13, wherein each outlet port is located on a chamfered side surface of the coolant bonnet.

18. The coolant bonnet of claim 13, wherein each coolant duct is circular in cross-sectional shape.

\* \* \* \* \*